(12) United States Patent
Jasiobedzki et al.

(10) Patent No.: US 9,285,481 B2
(45) Date of Patent: Mar. 15, 2016

(54) WEARABLE OBJECT LOCATOR AND IMAGING SYSTEM

(75) Inventors: Piotr Jasiobedzki, Mississauga, CA (US); Cameron Scott Dickinson, North York (CA); Ho-Kong Ng, Thornhill, CA (US); Michel Bondy, Caledon, CA (US)

(73) Assignee: MACDONALD, DETTWILER AND ASSOCIATES INC., Brampton, Ontario (CA)

( * ) Notice: Subject to any disclaimer, the term of this patent is extended or adjusted under 35 U.S.C. 154(b) by 481 days.

(21) Appl. No.: 13/589,957

(22) Filed: Aug. 20, 2012

(65) Prior Publication Data

US 2014/0062772 A1  Mar. 6, 2014

(51) Int. Cl.
| | |
|---|---|
| G01S 19/45 | (2010.01) |
| G01C 3/08 | (2006.01) |
| G01C 11/02 | (2006.01) |
| G01S 17/02 | (2006.01) |
| G01S 17/87 | (2006.01) |
| G01S 5/02 | (2010.01) |
| G01S 5/12 | (2006.01) |

(52) U.S. Cl.
CPC . *G01S 19/45* (2013.01); *G01C 3/08* (2013.01); *G01C 11/02* (2013.01); *G01S 5/0263* (2013.01); *G01S 5/0284* (2013.01); *G01S 5/12* (2013.01); *G01S 17/023* (2013.01); *G01S 17/87* (2013.01)

(58) Field of Classification Search
CPC .......... G01S 19/47; G01S 19/49; G01S 19/51
USPC .............................. 342/357.3, 357.32, 357.34
See application file for complete search history.

(56) References Cited

U.S. PATENT DOCUMENTS

| | | | |
|---|---|---|---|
| 6,781,618 B2 | 8/2004 | Beardsley | |
| 7,647,197 B2 | 1/2010 | Prentice et al. | |
| 8,024,151 B2 | 9/2011 | Van Toorenburg et al. | |
| 2010/0312142 A1* | 12/2010 | Demirdjian et al. | 600/587 |
| 2012/0059575 A1* | 3/2012 | Hartman et al. | 701/300 |
| 2012/0283896 A1* | 11/2012 | Persaud et al. | 701/2 |
| 2012/0302129 A1* | 11/2012 | Persaud et al. | 446/454 |

* cited by examiner

*Primary Examiner* — Harry Liu

(57) ABSTRACT

An object locator system for locating an object of interest in a scene. The locator system includes: a) a body mounted pedestrian localization unit worn by an operator; b) a hand-held rangefinder configured to be grasped by the operator; c) a pose sensor for estimating relative position and orientation of the hand-held rangefinder relative to the localization device; and d) a computer control system coupled to the pedestrian localization unit, the rangefinder, and the pose sensor, the computer control system being programmed to compute a relative location of the object with respect to the body worn localization unit using range data from the rangefinder and relative pose from the pose sensor, and transform the relative location to a global location using data from the pedestrian localization unit.

37 Claims, 5 Drawing Sheets

WEARABLE OBJECT LOCATOR AND IMAGING SYSTEM

FIELD

The present invention relates to a wearable object locator and imaging system.

BACKGROUND

Conducting police and fire investigations involves recording locations and taking images of objects of interest or detector measurements in crime or fire scenes. It is important to maintain sufficient stand-off distances from such objects so as not to disturb or contaminate the scene, or to expose investigators to hazards. All collected data must be properly recorded including acquisition time, exact locations of the objects and the recording devices to enable reconstruction of the scene, show investigation process, and re-create the most likely scenario that led to the event.

Currently, locations of objects of interest are measured using tape measures, hand held rangefinders, total stations, Global Navigation Satellite System (GNSS) receivers or indoor positioning systems. Images and videos are acquired using hand-held or tripod mounted cameras. Tripod mounted or hand held 3D cameras and 3D scanners are used to capture 3D representations of complete scenes including objects of interest. Location of these objects can be obtained by selecting them in the 3D scans. For conducting police and fire investigations it is preferable to use hand-held or wearable devices that are easy to deliver and operate in the scene, and that do not require complex deployment on a tripod or to be delivered on a mobile platform.

Locations of objects of interest in investigated scenes can be measured from stand-off distances using hand-held ranging devices such as laser rangefinders, if position and orientation of these devices can be determined in a coordinate system associated with the scene. Several technologies can be used for this purpose. Magnetic trackers, such as manufactured by Ascension, can measure accurately 6 degrees of freedom of a hand-held device (the rangefinder) equipped with a sensor. The working volume of such systems is typically up to several meters and is not sufficient for most of the investigations.

Optical trackers, such as Optotrak developed by NDIGITAL, use a calibrated array of cameras to track special targets that may be attached to the hand-held device. However, these cameras must be installed on rigid supports and calibrated before use; the targets must be visible by multiple cameras at the same time. The number of required cameras and lengthy setup process is not suitable for investigations.

Systems that rely on Global Navigation Satellite System (GNSS) receivers, compasses and inclinometers to estimate the location and orientation of the rangefinder do not require any additional infrastructure in the scene. However, such systems require reliable GNSS signals and compass measurements and must be operated outdoors and at suitable distance from buildings, trees and objects that may affect the magnetic field. Toorenberg and Hartman independently disclose systems based on this principle for use in surveying.

A similar system with an integrated infra-red camera, IR513 Multifunctional Handheld Thermal Camera, is available from Armstrong Optical. Different technologies have been developed for estimating location of pedestrians.

NavShoe developed by InterSense uses foot-mounted inertial sensors to estimate the motion of a person wearing the system. Ojeda and Borenstein [Ojeda] developed a similar system to provide a location and use a second inertial sensor to provide relative orientation between the foot-mounted sensor and a hand-held device.

Other pedestrian localisation systems rely on pre-existing infrastructure in the buildings. Several solutions based on WiFi networks have been developed to provide an approximate location of a hand held detector/smart phone inside buildings. These systems provide only coarse location and require that the networks are fully mapped before use and are fully operational when the system is in use. Special Radio Frequency beacons can be deployed inside and outside the buildings and used for localisation. Radio Frequency Identification (RFID) tags may be placed throughout buildings and used for localisation but they must be placed and surveyed before they can be used operationally.

Conducting investigations requires an ability to operate in scenes not necessarily equipped with such infrastructure and installing it after the event poses many practical challenges: installation time and cost, and possibility for contaminating the scene and exposing investigators to hazards present in the scene.

During investigations, images captured by each camera and measurements collected by each device are saved in its own internal storage separately. The data is often represented in different data formats, and are not spatially linked to the other device data. This makes it difficult for the investigators to understand quickly the relationship between the data. Assigning data to specific locations manually is possible but is labour intensive and error prone.

The drawbacks of existing technologies include: need for infrastructure installed and calibrated before it can be used, short range of operations or requirement for a clear line of sight, reliable GNSS signal and compass readings. The data must be collected and organized in a way that is easy for data searching and data mining during and after the investigation. The invention described in this document addresses many of the above limitations.

SUMMARY

The invention provides an efficient means of both collecting investigative data, and locating its position in both GNSS-accessible and GNSS-denied areas. This data includes the absolute positions of objects of interest in GNSS coordinates, images of the objects, measurements obtained with wearable or hand-held detectors during the investigation and a recorded and/or transcribed record of the investigation made by the investigator. GNSS data is used for location determination while in GNSS-accessible areas, whereas a wearable pedestrian localisation unit (PLU) is used to provide position estimates while in GNSS-denied areas. A reference target, located at a known location on the investigator's body near the pedestrian localisation unit, is detected by an imaging system (Pose Camera—PC) to determine position and orientation (pose) of a second imaging system (Imaging Camera—IC) that is used to image targets of interest, while a laser rangefinder (LRF) coupled to the Image Camera provides the distance to the object of interest. Location of this object relative to the pedestrian unit is determined by using the relative pose computed using the PC images, the estimated distance and known spatial relationship between the PC and the LRF.

Thus, an embodiment of an object locator system for locating an object of interest, comprising:

a) a body mounted pedestrian localization unit worn by an operator;

a) a hand-held rangefinder configured to be grasped by the operator;

c) a pose sensor for estimating relative position and orientation of said hand-held rangefinder relative to said localization device; and d) a computer control system coupled to the said pedestrian localization unit, said rangefinder, and said pose sensor, said computer control system being programmed to compute a relative location of the object with respect to said body worn localization unit using range data from the said rangefinder and relative pose from said pose sensor, and transform the relative location to a global location using data from said pedestrian localization unit.

Another embodiment disclosed herein provides a method of locating an object of interest in a scene, comprising:

a) attaching a body worn pedestrian localization unit to a part of an operator's body;

a) aiming a hand-held rangefinder at an object of interest and obtaining distance data of the object of interest from the hand-held rangefinder;

c) estimating a relative position and orientation of said hand-held rangefinder relative to said localization device using a pose sensor; and d) computing a relative location of the object of interest with respect to said body worn localization unit using the distance data and the estimated relative pose from said pose sensor, and transforming the relative location to a global location using data from said pedestrian localization unit.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which.

DETAILED DESCRIPTION OF EMBODIMENTS

Figure 1:
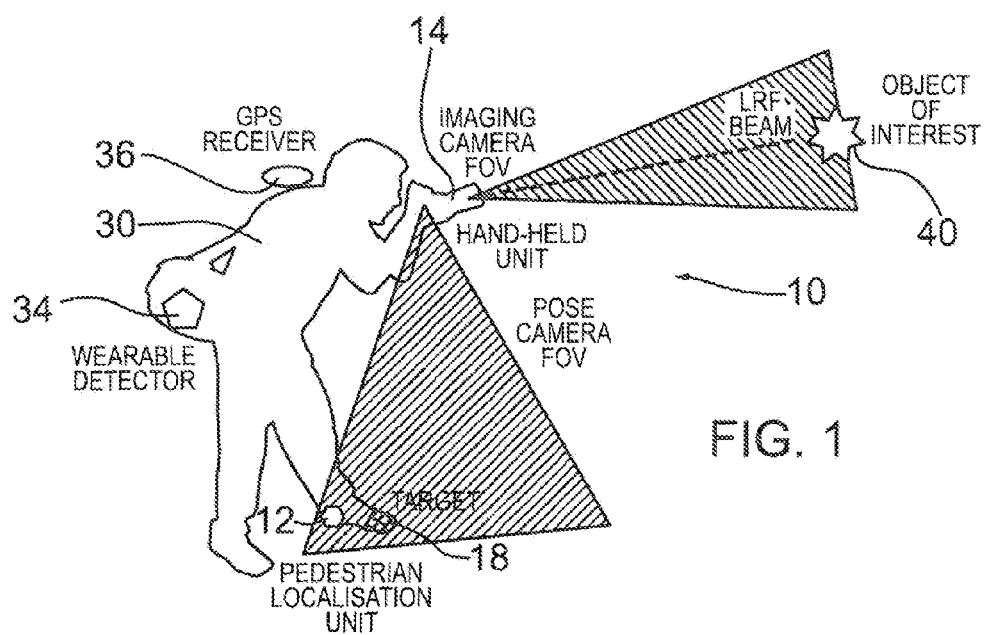
FIG. 1 is an illustration showing a principle of operation and key hardware components of the present system deployed by an investigator.

Various embodiments and aspects of the disclosure will be described with reference to details discussed below. The following description and drawings are illustrative of the disclosure and are not to be construed as limiting the disclosure. The drawings are not necessarily to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

As used herein, the term "exemplary" means "serving as an example, instance, or illustration," and should not be construed as preferred or advantageous over other configurations disclosed herein.

Embodiments of the present invention provide methods and systems for locating object of interest (estimating their location) and recording images and data during investigations.

The wearable object locator and imaging system and method disclosed herein provides an efficient means of both collecting investigative data, and locating its position in both GNSS-accessible and GNSS-denied areas. This data includes the absolute positions of objects of interest in GNSS coordinates, images of the objects, measurements obtained with wearable or hand-held detectors during the investigation and a recorded and/or transcribed record of the investigation made by the investigator. GNSS data is used for location determination while in GNSS-accessible areas, while a wearable pedestrian localisation unit (PLU) is used to provide position estimates while in GNSS-denied areas.

A reference target, located at a known location on the investigator's body near the pedestrian localisation unit, is detected by an imaging system (Pose Camera—PC) to determine position and orientation (pose) of a second imaging system (Imaging Camera—IC) that is used to image targets of interest, while a laser rangefinder (LRF) coupled to the Image Camera provides the distance to the object of interest. Location of this object relative to the pedestrian unit is determined by using the relative pose computed using the PC images, the estimated distance and known spatial relationship between the PC and the LRF.

Referring first to FIG. 1, in one embodiment the system 10 comprises a foot or body mounted pedestrian localisation unit (PLU) 12 and a hand-held unit 14. An illustration of this embodiment of the system during acquisition is shown in FIG. 1. PLU unit 12 is a body mounted device that estimates location of a person using body mounted sensors (for example, but not limited to, gyros, accelerometers, compasses) that measure the person's motion and heading.

Figure 2:
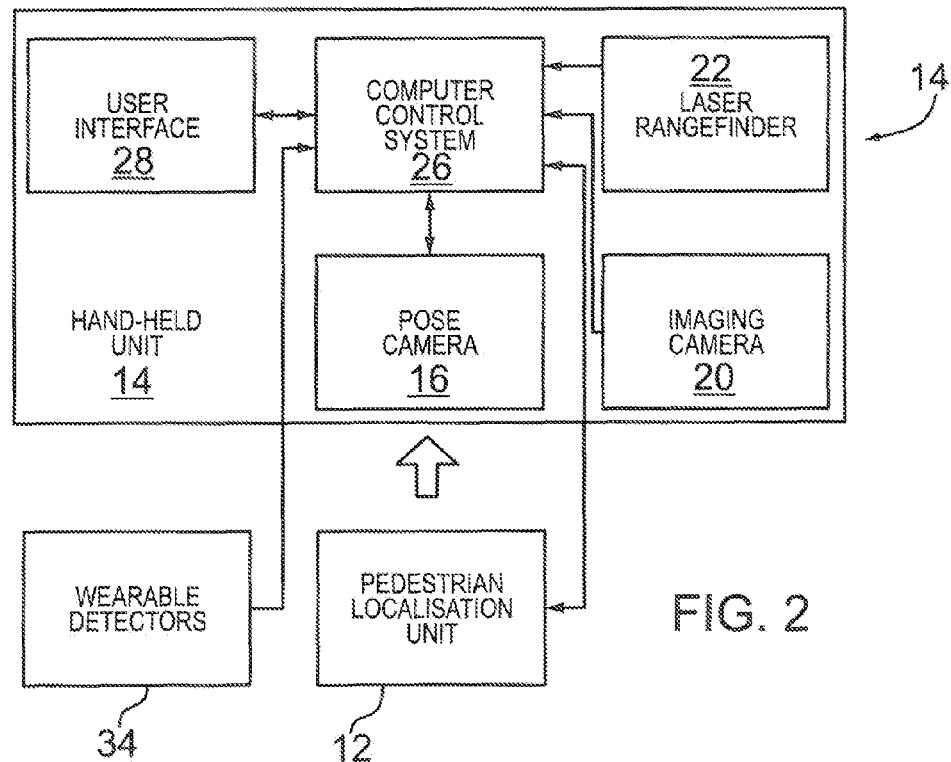
FIG. 2 is a block diagram showing the architecture and data flow in the present system shown in FIG. 1.

Referring to FIG. 1 and the block diagram of FIG. 2, the hand-held unit 14 comprises a pose camera (PC) 16, an imaging camera (IC) 20, rangefinder (LRF) 22 (preferably a laser rangefinder) and a computer control system 26 with a user interface 28. PC 16, IC 20 and LRF 22 are coupled together and their spatial relationship with each other is known. A small visual target 30 (FIG. 1 only) is placed in a known location with respect to the PLU 12 and is observed during data acquisition by the PC 16 in the hand-held unit 14. In the embodiment of FIG. 1, the pose camera 16, imaging camera 20, and laser range finder 22 are interfaced with the computer control system 26 equipped with the user interface 28, and are all integrated into hand-held unit 14. It will be appreciated that in some applications only laser rangefinder (LRF) 22 is required but a preferred embodiment of the system includes imaging camera 20.

The pose camera 16 observes the visual target 18 or another object with a known spatial relationship related to the PLU 12 at a distance of approximately between 0.5 to 2 m, and therefore can be optimised for such a distance by selecting the focus setting or operating range. The field of view of this camera 16 should be selected in such a way so as to observe the target in all positions and orientations useful for operating the hand-held unit 14. The pose camera 16 may be providing 2D images or 3D (range) images or both. Algorithms for detecting the target 18 will typically rely on their visual appearance or shape.

The imaging camera 20 may be a two dimensional (2D) camera operating in visible, infra-red or UV spectrum depending on a specific application. For example, during forensic investigations UV illumination is used to excite fluorescence of biological samples (otherwise invisible), which is then detected by a special camera. It is noted that this special camera may be distinct from the imaging camera 20 or it could be the imaging camera 20 with the latter suitably configured for such operations.

Infra-red cameras provide information about the thermal distribution in the observed scene and may for example indicate presence of operating electronics or aerosols. The imaging camera 20 may also be a 3D camera that provides range images (or point clouds) representing geometry of the observed scene. The imaging camera 20 may also provide spectral information of the observed scene by using multiple imaging sensors or filters.

FIG. 2 is the block diagram showing the hardware architecture of the system of FIG. 1. The body mounted PLU 12 is interfaced with the computer control system 26 via cables or wireless means. Optional wearable detectors 34 may be interfaced with computer control system 26 using physical cables or wireless means. An optional GNSS receiver 36 (FIG. 1 and associated hardware architecture block diagram shown in FIG. 6) with a compass may be integrated with the hand-held unit 14 or as a separate physical unit, and it is interfaced with computer control system 26. This receiver 36 will provide absolute location if reliable GNSS signal and compass readings are available. There is no direct physical interface between the PLU 12 and pose camera 16 however, the PC 16 observes a visual target 18 associated with the PLU 12 allowing estimating the relative PLU 12 location.

Figure 7:
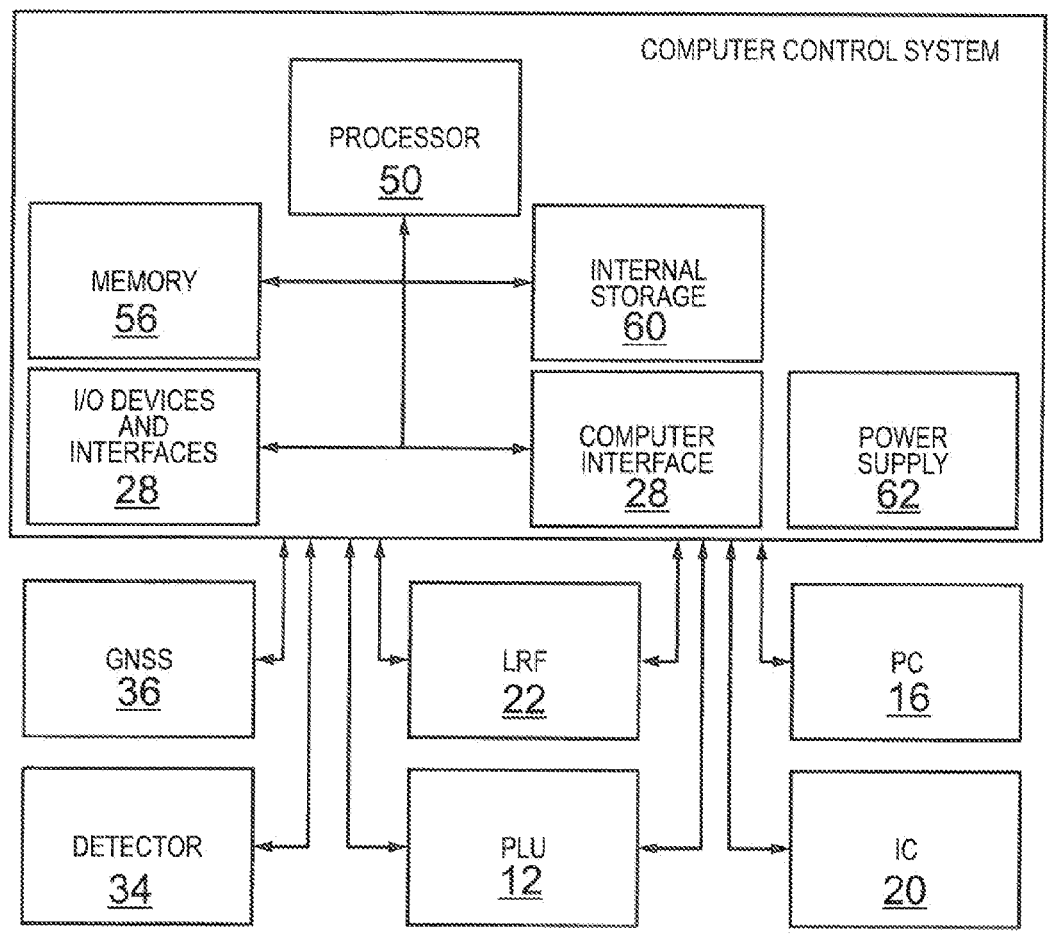
FIG. 7 shows an exemplary block diagram of a structure of the computer control system forming part of the present invention.

FIG. 7 provides an exemplary, non-limiting implementation of computer control system. Computer control system 26, forming part of the command and control system, may, but include one or more processors 50 (for example, a CPU/microprocessor), bus 52, memory 56, which may include random access memory (RAM) and/or read only memory (ROM), one or more internal storage devices 60 (e.g. a hard disk drive, compact disk drive or internal flash memory), a power supply 62, one or more communications interfaces 64, and various input/output devices and/or user interfaces 28.

Although only one of each component is illustrated in FIG. 7, any number of each component can be included computer control system 26. For example, a computer typically contains a number of different data storage media. Furthermore, although bus 52 is depicted as a single connection between all of the components, it will be appreciated that the bus 52 may represent one or more circuits, devices or communication channels which link two or more of the components. For example, in personal computers, bus 52 often includes or is a motherboard.

In one embodiment, computer control system 26 may be, or include, a general purpose computer or any other hardware equivalents configured for operation in space. Computer control system 26 may also be implemented as one or more physical devices that are coupled to processor(s) 50 through one or more communications channels or interfaces. For example, computer control system 26 can be implemented using application specific integrated circuits (ASIC). Alternatively, computer control system 26 can be implemented as a combination of hardware and software, where the software is loaded into the processor from the memory or over a network connection.

Computer control system 26 may be programmed with a set of instructions which, when executed in the processor 50, causes the system to perform one or more methods described in the present disclosure. Computer control system 26 may include many more or less components than those shown. As shown, computer control system 26 is interfaced with PLU 12, LRF 22, pose camera 16, imaging camera 20, optional wearable detector(s) 34 and optional GNSS unit 36.

While some embodiments have been described in the context of fully functioning computers and computer systems, those skilled in the art will appreciate that various embodiments are capable of being distributed as a program product in a variety of forms and are capable of being applied regardless of the particular type of machine or computer readable media used to actually effect the distribution.

A computer readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices. In general, a machine readable medium includes any mechanism that provides (i.e., stores and/or transmits) information in a form accessible by a machine (e.g., a computer, network device, personal digital assistant, manufacturing tool, any device with a set of one or more processors, etc.). Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., compact discs (CDs), digital versatile disks (DVDs), etc.), among others. The instructions can be embodied in digital and analog communication links for electrical, optical, acoustical or other forms of propagated signals, such as carrier waves, infrared signals, digital signals, and the like.

Some aspects of the present disclosure can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version. Alternatively, the logic to perform the processes as discussed above could be implemented in additional computer and/or machine readable media, such as discrete hardware components as large-scale integrated circuits (LSI's), application-specific integrated circuits (ASIC's), or firmware such as electrically erasable programmable read-only memory (EE-PROM's).

The computer control system 26 analyses the images from pose camera 16 and computes the relative position and orientation (pose) of the visual target 18 with respect to the hand-held unit 14. The visual target 18 may be a target mounted specifically for the purpose of estimating relative pose of PLU 12 or may be an existing part of the pedestrian clothing or hand-held unit. Relative pose of the PLU 12 is computed using a known spatial relationship between the target and PLU 12. The LRF 22 is pointed at an object or a feature of interest 40, and measures the distance. This distance, the computed pose of the PC 16 and known spatial relationship between the LRF 22 and PC 16 is used to estimate location of the object of interest 40 to the local coordinate system of the PLU 12. Given:

$P_{PLU1}^{PLU0}$: Relative pose estimated by the PLU from its initial location (PLU0) to the current location (PLU1)

$P_{VT}^{PC}$: Pose of the Visual Target with respect to the Pose Camera estimated by the Processor from the image(s)

$P_{VT}^{PLU}$: Fixed pose of the Visual Target with respect to the PLU $P_{IC}^{PC}$: Fixed pose of the Imaging Camera with respect to the Pose Camera $pt_{OBJ}^{IC} = [i\ j\ d]^T$: Location of the object with respect to the Imaging Camera, where i and j are obtained from extracted the object from the image, and d is the distance between the object and Pose Camera reported by the LRF The position of the object of interest with respect to the initial PLU location can be computed from:

$$pt_{OBJ}^{PLU0} = P_{PLU1}^{PLU0} * P_{VT}^{PLU} * (P_{VT}^{PC})^{-1} * P_{IC}^{PC} * pt_{OBJ}^{IC}$$

Images of the objects of interest can be captured using the imaging camera (IC) 20. Location and pointing angles of the IC 20 during acquisition are calculated using PC 16 images and known spatial relationship between PC 16 and IC 20. The LRF 22 may be pointed by observing a designator spot in the scene or by observing the imaging camera 20 image in the user interface 28, as the IC 20 and LRF 22 are aligned and calibrated together. When the investigator acquires an image of an object of interest, the physical position of the object's location is recorded and associated with the image. In addition, the investigator's location and orientation, and the location and orientation of IC 20 is associated with this event are also recorded in the context of this chosen object in the scene.

The body worn PLU 12 typically operates in an incremental mode and provides location relative to the initial location where the unit was started or reset. This initial location and heading may be assigned to a point on a global map in the scene manually or automatically using another global localisation system. Sequences of locations estimated with PLU 12 represent the investigator's motion through the scene and can be plotted as a trajectory on a map.

As all measurements with LRF 22, PC 16, PLU 12, IC 20 and detectors 34 are either time-stamped or synchronised, and they can be registered in the time domain. The accuracy of this registration depends on the accuracy of measuring the time, synchronisation of the devices and their internal clocks, time interpolation methods and the investigator's speed while moving through the scene. This temporal synchronisation enables mapping the locations of objects of interest from a local coordinate system associated with PLU 22 location when the measurement was performed to a global coordinate system used by PLU 22.

Given:
t: time stamp of a measurement
$t_{-1}$ and $t_{+1}$: time stamps of the PLU data before and after t
$P_{IC}^{PLU0}|_{t_{-1}}$ and $P_{IC}^{PLU0}|_{t_{+1}}$: the recorded poses of the Imaging Camera with respect to the initial pose of the PLU corresponding to time $t_{-1}$ and $t_{+1}$ The pose of the measurement (same as the pose of the Imaging Camera in this discussion) at time t can be computed from:

$$P_{IC}^{PLU0}|_t = (P_{IC}^{PLU0}|_{t_{+1}} - P_{IC}^{PLU0}|_{t_{-1}}) * \frac{t - t_{-1}}{t_{+1} - t_{-1}} + P_{IC}^{PLU0}|_{t_{-1}}$$

Figure 3:
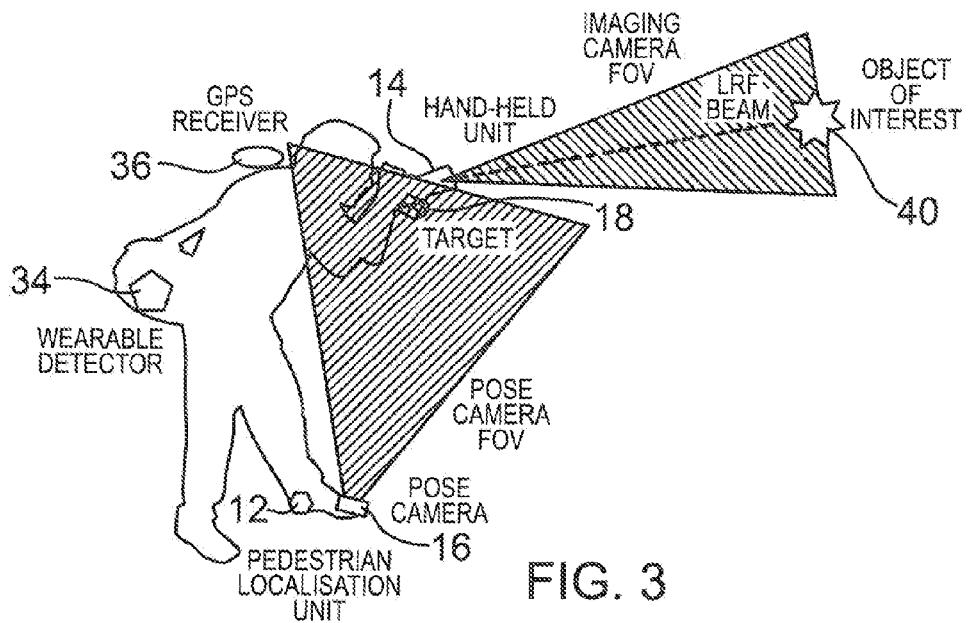
FIG. 3 is an illustration showing an alternative arrangement of the key hardware components to the arrangement shown in FIG. 1.
Figure 4:
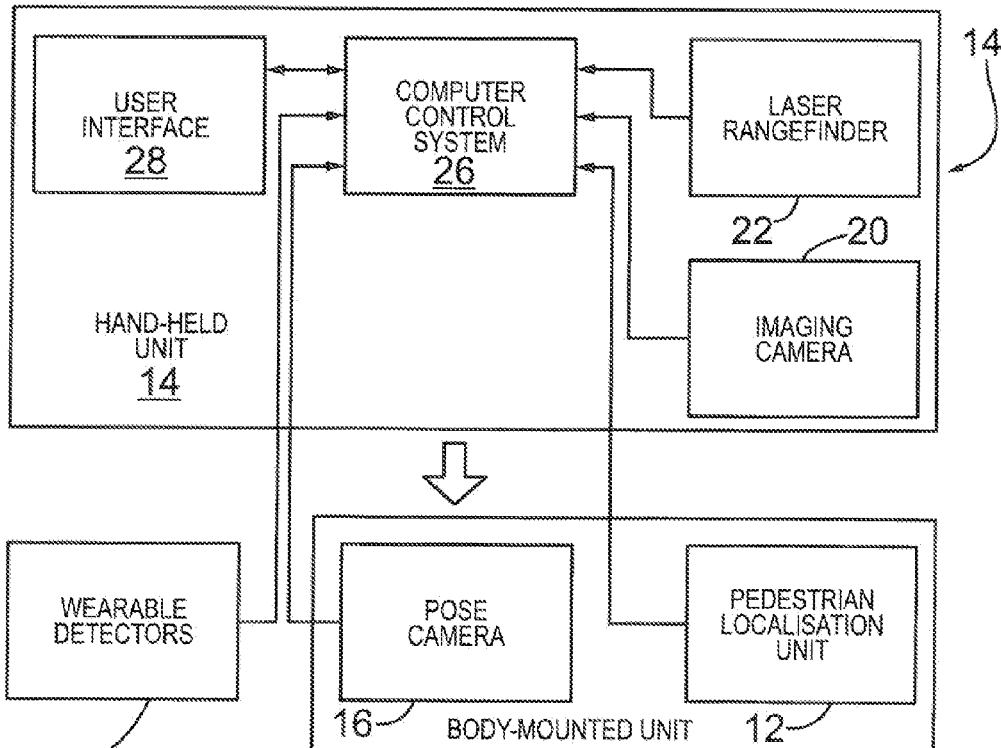
FIG. 4 is a block diagram showing the architecture and data flow in the second embodiment of the present system.

In a second embodiment of the system shown in FIG. 3, the pose camera 16 is mounted in a location with a known spatial relation to the PLU 12 and the visual target 18 is attached to the hand-held unit 14 or mounted with a known spatial relationship. FIG. 3 is an illustration showing the system during use and FIG. 4 is the architecture diagram.

Figure 5:
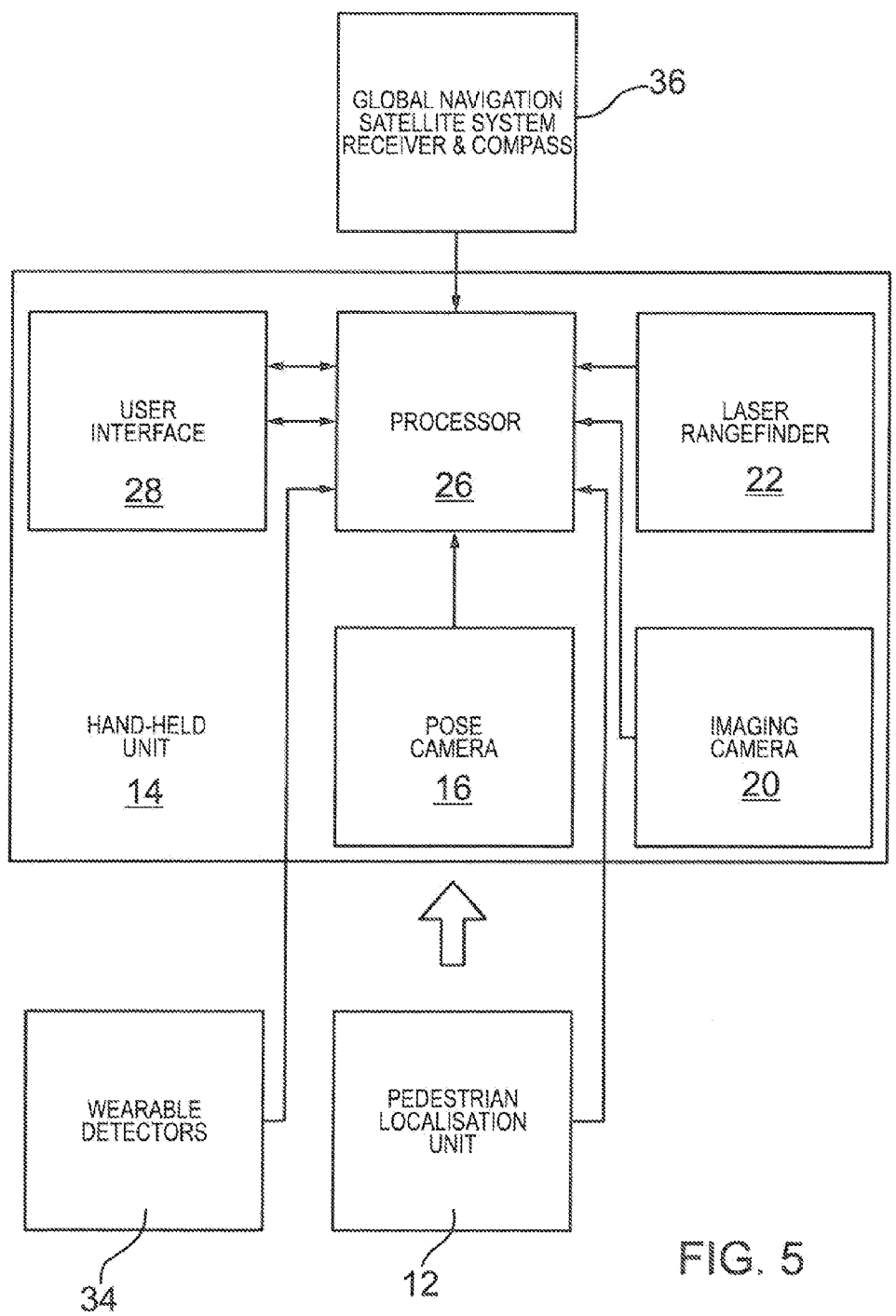
FIG. 5 is a block diagram showing a third embodiment of the present system with a GNSS receiver and a compass.

As mentioned above, another embodiment of the present system and method may use a GNSS receiver and a compass 36 as shown in FIGS. 1 and 5. If reliable GNSS signal and compass readings are available when the PLU 12 is operated, then the location estimates may be assigned with absolute coordinates. This allows transforming all locations of objects of interest to the absolute coordinate system and visualisation in a Geographic Information System. Also given:

$P_{PLU}^{W}$: Pose of the PLU in the world reported by the GNSS and compass data the position of the object of interest with respect to the world can be computed from:

$$pt_{OBJ}^{PLU0} = P_{PLU}^{W} * P_{VT}^{PLU} * (P_{VT}^{PC})^{-1} * P_{IC}^{PC} * pt_{OBJ}^{IC}$$

Additional information can also be collected including audio recordings and data from optional external detectors. The audio recordings may be saved as audio files or may be transcribed and saved a text, as determined by the investigator. All images, positions, audio data, text files, and external data is time-tagged for reference and stored within the hand-held device or retrieved remotely via wireless means.

Figure 6:
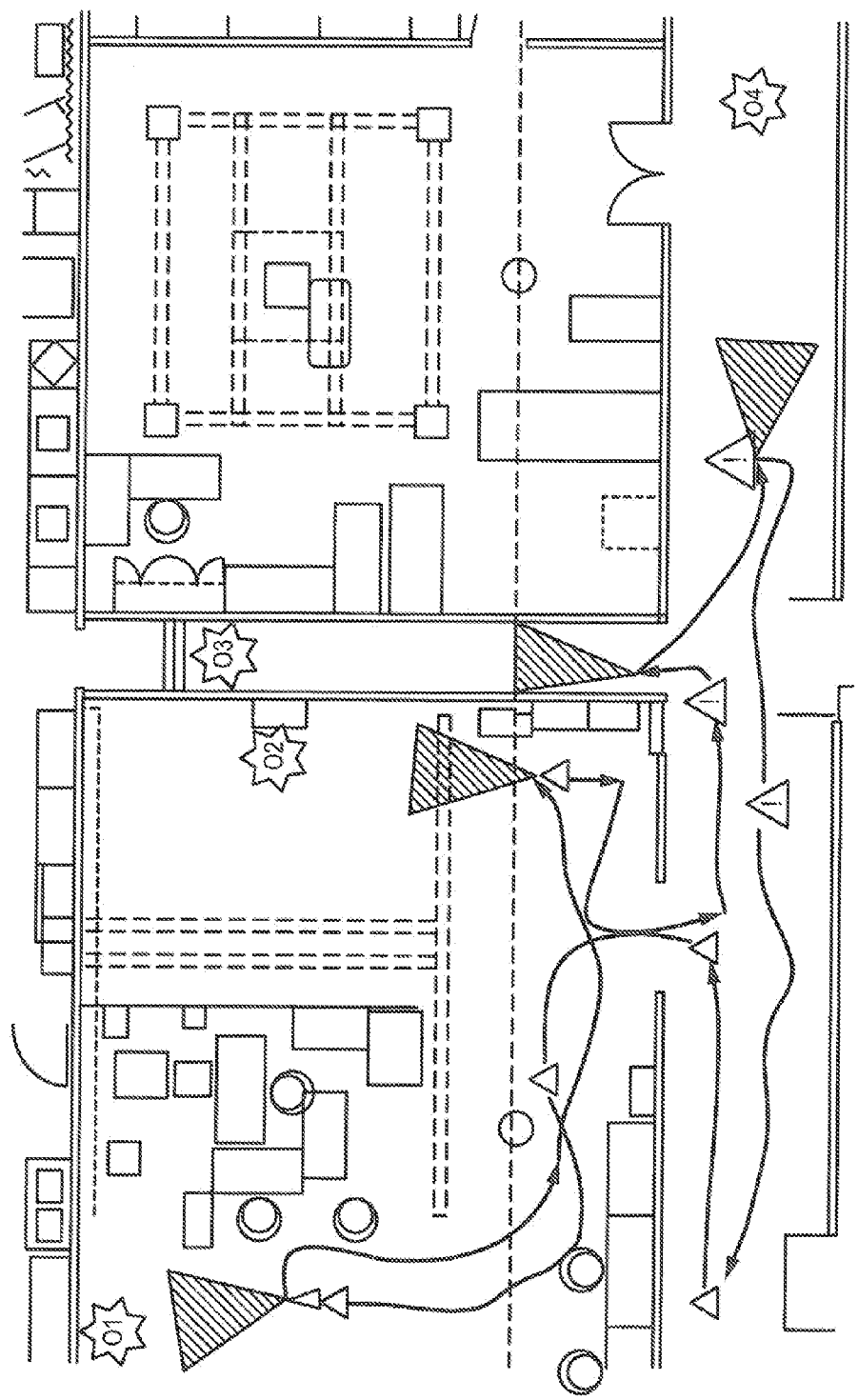
FIG. 6 is an illustration of data visualization that can be produced by the systems disclosed herein.

Complete data including paths followed by the investigator, locations and images of objects of interest, measurements from additional detectors can be displayed on the User Interface or transferred to an external computer. The data may be overlayed on a map of the investigated scene, if such is available, showing the paths and locations. FIG. 6 is an illustration of such a display. Continuous lines overlayed on a floor map of a building show the paths taken by the investigator with the arrows indicating locations where he stopped. Crossed triangles indicate the camera locations and bearing of the captured images. Star shapes indicate locations of objects of interest measured from a stand-off distance. Small triangles indicate locations where measurements with an additional detector have been obtained: empty triangles indicate no threat level and triangles with the "|" symbol indicates elevated hazard levels.

The described invention can be also used to collect series of measurements from one or multiple locations and operate similarly to a total station. Total stations comprised of a laser rangefinder mounted on a gimbal that provide accurate measurements of azimuth and elevation. Location of an object or feature of interest is measured by combing distance from LRF 22, two angles from the gimbal and known spatial relationship between the LRF 22 and the gimbal of the total station. In the current invention the LRF 22 is part of the Hand-held Unit and its position orientation relative to the PLU 12 is estimated for each measurement by processing the PC 16 images and applied to each LRF 22 measurement. Measurements obtained from multiple locations are combined together using estimates from PLU 12.

Instead of relying on special visual targets for estimating relative pose between the hand-held unit and PLU 12 it is possible to rely on the appearance and/or shape of the PLU 12 or hand-held unit 14. However, pose estimation accuracy may be lower than when not using a purpose built target 12.

The pose camera 16 may be either a 2D camera that captures 2D images or a 3D camera providing range images or point-clouds. Depending on the type of camera, different algorithms will be used to detect the Target and estimate its position. Visual targets, such as Space Vision Marker System [4] or AR markers [5] can be used.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

REFERENCES

1. Hartman US 2012/0059575 Target Locator Device and Methods
2. Toorenberg U.S. Pat. No. 7,647,197 Mobile Instrument, Viewing Device, and Methods of Processing and Storing Information.
3. Toorenberg, U.S. Pat. No. 8,024,151 Mobile Instrument, Viewing Device, and Methods of Processing and Storing Information
4. Ojeda, L. and Borenstein, J., 2011, "Transfer Alignment from a Personal Dead Reckoning System to a Handheld IMU." Proceedings of the SPIE Defense, Security+Sensing; Conference DS209: Head- and Helmet-Mounted Displays XVI: Design and Applications. Orlando, Fla., April 25-29.
5. M. Bondy, R. Krishnasamy, D. Crymble, P. Jasiobedzki, Space Vision Marker System (SVMS), AIAA SPACE 2007 Conference & Exposition, 18-20 Sep. 2007, Long Beach, Calif.
6. Kato, H., Billinghurst, M. "Marker tracking and hmd calibration for a video-based augmented reality conferencing system.", In Proceedings of the 2nd IEEE and ACM International Workshop on Augmented Reality (IWAR 99), October 1999
7. Armstrong Optical http://www.armstrongoptical.co.uk
8. Ascension http://www.ascension-tech.com/
9. Intersense http://www.intersense.com/
10. Optotrak http://www.ndigital.com/

Therefore what is claimed is:

1. An object locator system for locating an object of interest in a scene, comprising:
   a) a hand-held rangefinder configured to be grasped by the operator
   b) a body mountable pedestrian localization unit configured to be worn by an operator spaced from said hand-held rangefinder;
   c) a pose sensor for estimating relative position and orientation of said hand-held rangefinder relative to said localization device; and
   d) a computer control system coupled to said pedestrian localization unit, said rangefinder, and said pose sensor, said computer control system being programmed to compute a relative location of the object with respect to said body worn localization unit using range data from said rangefinder and relative pose from said pose sensor, and transform the relative location to a global location using data from said pedestrian localization unit.

2. The system according to claim 1 wherein the body worn pedestrian localization unit includes a foot mounted sensor.

3. The system according to claim 1 wherein the body worn pedestrian localization unit includes a torso mounted sensor.

4. The system according to claim 2 wherein the foot mounted sensor is an inertial sensor.

5. The system according to claim 3 wherein the torso mounted sensor is an inertial sensor.

6. The system according to claim 1 wherein said sensor for estimating relative pose includes
   a camera, and
   a feature on the operator's body, and wherein said camera has a known spatial relationship with said rangefinder, said camera being configured to observe said feature on the operator's body with a known spatial relationship between said feature and said pedestrian localization unit.

7. The system according to claim 1 wherein said sensor for estimating relative pose is a 3D camera.

8. The system according to claim 6 wherein said feature is a visual target.

9. The system according to claim 6 wherein said feature is a visual target which is a designated part of clothing worn by the operator.

10. The system according to claim 1 wherein said sensor for estimating relative pose includes
    a feature on said rangefinder, and
    a camera configured for observing said feature on said rangefinder, said camera having a known spatial orientation to said pedestrian localization device.

11. The system according to claim 10 wherein said camera is mounted on a body part of the operator such that it has a field of view in which the feature is located.

12. The system according to claim 10 wherein the camera is a 3D camera providing one of range images and point-clouds.

13. The system according to claim 10 wherein said camera is a 2D camera that captures 2D images.

14. The system according to claim 10 wherein said feature is a visual target with a known spatial relationship to the rangefinder.

15. The system according to claim 1 wherein said hand-held rangefinder is coupled with an imaging camera.

16. The system according to claim 15 wherein said imaging camera is a 3D camera providing one of range images and point-clouds.

17. The system according to claim 15 wherein said imaging camera is a 2D camera that captures 2D images.

18. The system according to claim 15 wherein said imaging camera is configured to operate in any one or combination of visible, infra-red or UV spectrum.

19. The system according to claim 1 further comprising a light source mounted on said hand-held unit, said light source configured to emit light of selected frequencies for illuminating the scene being recorded.

20. The system according to claim 1 wherein said hand-held rangefinder is a laser rangefinder.

21. The system according to claim 6 wherein said computer control system is programmed to
analyse images from said pose sensor and compute a relative position and orientation (pose) of said feature,
compute a relative pose of the pedestrian localization unit computed using a known spatial relationship between said feature and said pedestrian localization unit, and
computing a location of the object of interest in a local coordinate system of said pedestrian localization unit using a measured distance between the hand-held rangefinder and said object of interest, the relative pose of the pedestrian localization unit from a known starting point and a known spatial relationship between the hand-held rangefinder and said pose sensor.

22. The system according to claim 1 further comprising a GNSS and optionally a compass coupled with said processor, and wherein said processor is programmed to transform the global location of the specified object of interest to an absolute location using said GNSS and compass.

23. The system according to claim 22 wherein said processor is programmed to transform all locations of objects of interest to an absolute coordinate system and visualisation in a Geographic Information System.

24. The system according to claim 23 wherein the processor is programmed to provide a location and heading relative to an initial location where the system is started or reset, and wherein the processor is programmed to assign this initial location and heading to a point on a global map of the environment manually or automatically using another global localisation system.

25. A method of locating an object of interest in a scene, comprising:
 a) attaching a body worn pedestrian localization unit to a part of an operator's body;
 b) aiming a hand-held rangefinder at an object of interest and obtaining distance data of the object of interest from the hand-held rangefinder, the body worn pedestrian localization unit being mounted to the operator's body space from the hand-held rangefinder;
 c) estimating a relative position and orientation of said hand-held rangefinder relative to said localization device using a pose sensor; and
 d) computing a relative location of the object of interest with respect to said body worn localization unit using the distance data and the estimated relative pose from said pose sensor, and transforming the relative location to a global location using data from said pedestrian localization unit.

26. The method according to claim 25 wherein the body worn pedestrian localization unit includes a foot mounted sensor.

27. The method according to claim 25 wherein the body worn pedestrian localization unit includes a torso mounted sensor.

28. The method according to claim 26 wherein the foot mounted sensor is an inertial sensor.

29. The system according to claim 27 wherein the torso mounted sensor is an inertial sensor.

30. The method according to claim 25 wherein said feature is mounted on the operator's body, and wherein the sensor for estimating relative pose is a camera coupled with said rangefinder observing said feature mounted on the operator's body with a known spatial relationship between said feature and said pedestrian localization unit.

31. The method according to claim 25 wherein said feature is mounted on said rangefinder, and wherein said sensor for estimating relative pose is a camera observing said feature on said rangefinder, said camera having a known spatial orientation to said pedestrian localization device.

32. The method according to claim 25 including capturing images of the object of interest using an imaging camera coupled with the hand-held rangefinder.

33. The method according to claim 32 wherein said imaging camera is configured to operate in any one or combination of visible, infra-red or UV spectrum.

34. The method according to claim 25 further comprising illuminating the scene being recorded with light of selected wavelengths.

35. The method according to claim 25 further comprising coupling a GNSS and optionally a compass coupled with said operator and the computer control system, and wherein the computer control system is programmed to transform the global location of the object interest to an absolute location using said GNSS and compass.

36. The method according to claim 35 wherein said computer control system is programmed to transform all locations of objects of interest to an absolute coordinate system and visualisation in a Geographic Information System.

37. The method according to claim 36 wherein the processor is programmed to provide a location and heading relative to an initial location where the system is started or reset, and wherein the processor is programmed to assign this initial location and heading to a point on a global map of the environment manually or automatically using another global localisation system.

* * * * *